June 18, 1957    ZIRO TUZI    2,795,991
INDICATOR OF THE INTERFEROMETER TYPE FOR
INDICATING THE COMPOSITION OF GASES
Filed Dec. 7, 1953    2 Sheets-Sheet 1

INVENTOR.
ZIRO TUZI
BY
ATTORNEY

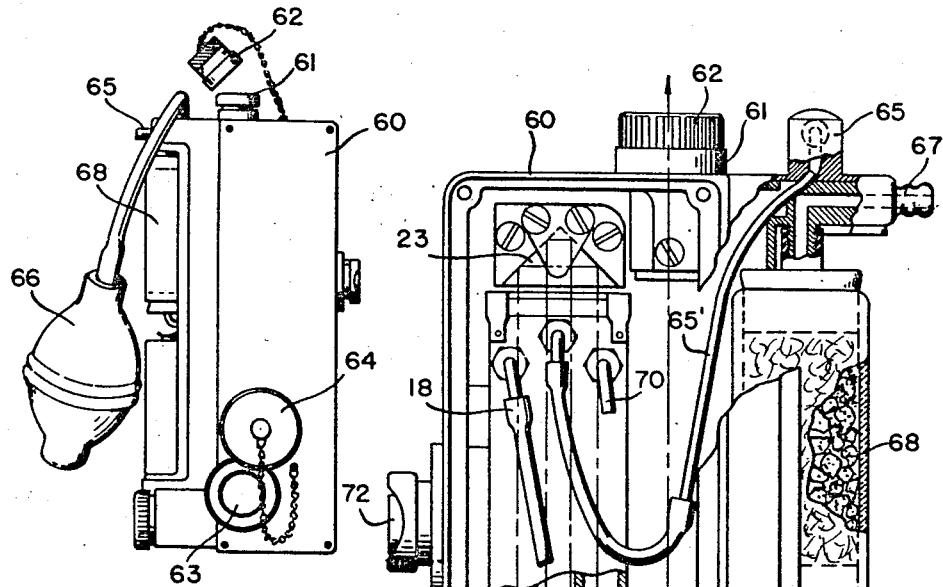
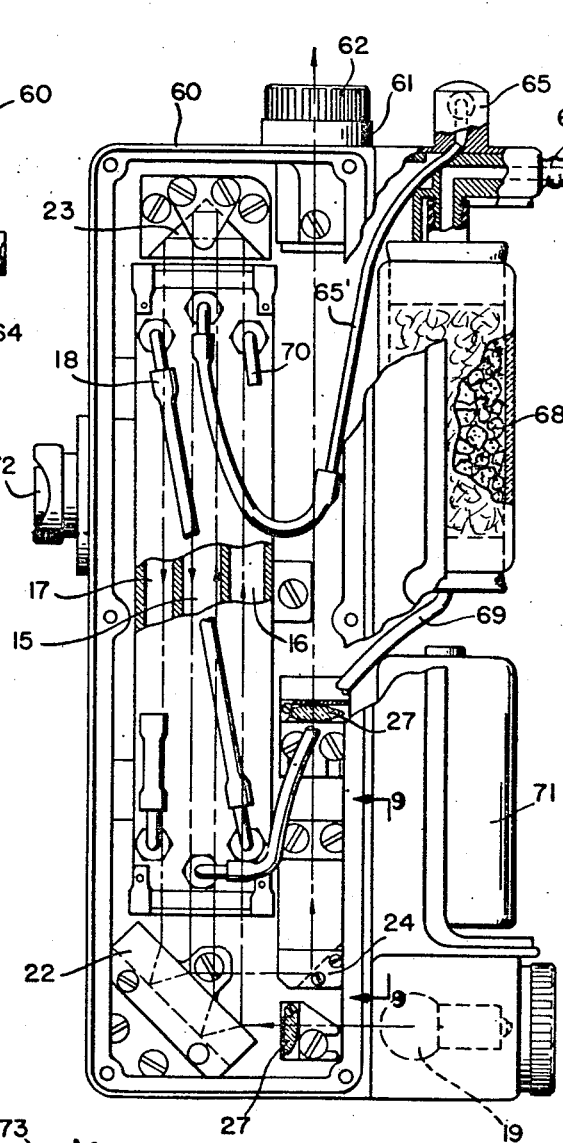
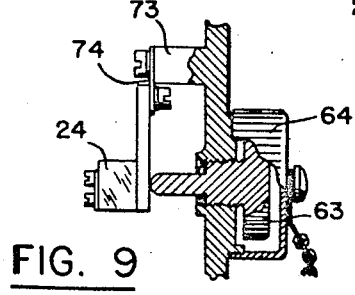
FIG. 7
FIG. 8
FIG. 9
INVENTOR.
ZIRO TUZI

United States Patent Office 2,795,991
Patented June 18, 1957

2,795,991

INDICATOR OF THE INTERFEROMETER TYPE FOR INDICATING THE COMPOSITION OF GASES

Ziro Tuzi, Setagaya-ku, Tokyo, Japan

Application December 7, 1953, Serial No. 396,628

Claims priority, application Great Britain May 28, 1953

10 Claims. (Cl. 88—14)

The present invention relates to interferometers or interference-refractometers, particularly to interferometers as used for detecting differences in the composition of a gas mixture to be supervised and a reference gas or gas mixture by means rendering viewable corresponding changes in the refractive indices of the mixture to be tested.

In interferometers designed for a comparative analysis of gases, it is customary to provide a standard or reference chamber containing a gas of known or at least constant composition and a test chamber communicating with the ambient atmosphere to be supervised. One of two parallel light beams obtained from a single source of light by a beam splitter such as a plane-parallel transparent plate is directed through the reference chamber and the second through the test chamber. The two beams are optically recombined and observed through a suitable optical system which makes viewable interference fringes when the refractive indices of the gases in the two chambers differ one from the other. By means of a correspondingly calibrated scale or other indicating means, the difference between the mixture of gas in the test chamber and the gas in the reference chamber may then be directly read.

The aforedescribed interferometer permits to ascertain the presence of a variety of gases such as methane, carbon monoxide and carbon dioxide as may be found particularly in the air in a coal mine.

Free air and particularly air in a coal mine frequently contain water vapors and carbon dioxide. As these substances affect the refractive indices, they interfere with the detection of certain gases such as methane gas and hence should not be permitted to penetrate into the interferometer. For this purpose it is customary to associate with the interferometer absorbent chemicals capable of removing water vapors and carbon dioxide.

The interferometric method affords a means of ascertaining dangerous or undesirable gases which is much more rapid, reliable and convenient than the chemical analysis frequently used for the purpose. However, an interferometer of the general kind above referred to, is rather sensitive to changes in the pressure of the ambient atmosphere which exert an influence upon the gases in the reference chamber and the test chamber. As the pressures in the chambers are not necessarily equal, such difference in pressure may falsify the indications of the instrument. Furthermore the initial calibration and the subsequent reading of the instrument must be carried out with great accuracy. Considerable difficulties have been encountered in providing convenient, reliable and accurate indicating means.

Accordingly one of the objects of the present invention is to provide novel and improved means connected with the reference or standard chamber and automatically equalizing the pressure between this chamber and the ambient atmosphere without permitting a penetration of the air to be tested into the reference chamber for a practically fully sufficient period of time.

Another object of the present invention is to provide a pressure equalizing means which is very compact and small in size so that it does not appreciably increase the overall dimensions of the instrument.

A further object of the invention is to provide novel and improved optical means which coact with the optical system of the instrument used for observing the interference fringes so as to permit a convenient and accurate measurement of the displacement of the interference fringes relative to a reference line by moving the fringes into a predetermined position relative to the reference line, the said displacement constituting an indication of the difference in the composition of the gases in the reference chamber and the test chamber respectively.

A more specific object of the invention resides in providing a measuring scale disposed in the focal plane of the eye-piece of the aforesaid optical system of the instrument.

Another more specific object of the invention resides in disposing a plane-parallel plate between the eye-piece and the objective lens of said optical system and turning the said plate about an axis perpendicular to the optical axis of the optical system, the angle of turning as required to move the interference fringes into a predetermined position relative to a reference line being indicative of the difference in the composition of the gases in the two chambers.

Still another more specific object of the invention resides in inserting relatively movable transparent wedges in the paths of the light beams through the two chambers. Again, the relative displacement of said wedges as required to move the interference fringes into a predetermined position relative to a reference line is indicative of the difference in the composition of the gas in the two chambers.

Other and further objects, features and advantages of the invention will be pointed out hereinafter and set forth in the appended claims forming part of the application.

In the accompanying drawings several now preferred embodiments of the invention are shown by way of illustration and not by way of limitation.

In the drawings:

Fig. 7 is an elevational outside view of an instrument according to the invention.

Fig. 8 is a structural view of the components of the instrument on an enlarged scale.

Fig. 9 is a fragmentary section taken on line 9—9.

Figure 1:
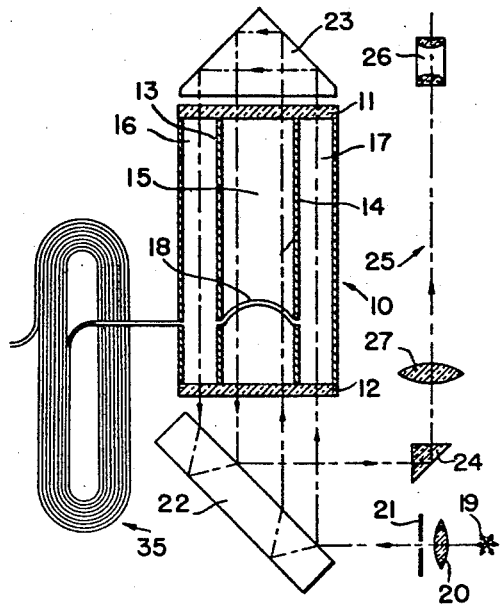
Fig. 1 is a diagrammatic view, partly in section, of an interferometer according to the invention.

Referring first to Fig. 1 in detail, the interferometer according to this figure comprises a casing generally designated by 10 and closed at both ends by transparent plates 11 and 12 respectively. Partition walls 13 and 14 within this casing divide the same so that there is formed a test chamber 15 and a reference or standard chamber having two passages 16 and 17 which communicate with each other by a conduit 18. All the chambers or passages are disposed parallel one with the other. The instrument further comprises a source of light 19, preferably a white light. Light emanating from this source directed through and made parallel by a condenser lens 20 and formed into a beam by a slit in a plate 21. This beam is incident upon a beam splitter 22 shown in form of a plane-parallel transparent plate and disposed adjacent to one end of casing 10. The beam splitter directs two parallel beams of light through test chamber 15 and passage 17 of the reference chamber respectively. The two beams are deflected by a 180° light deviating means 23 shown in form of a triangular prism and disposed adjacent to the other end of casing 10 back to beam splitter 22 through test chamber 15 and the second passage 16 of the reference chamber respectively. As a result, each beam traverses casing 10 twice so that the geometrical length of the chambers therein is in effect doubled. This has the advantage that the lengths for which the beams are affected by the atmospheres within the casing chambers is also doubled thereby obviously greatly increasing the sensitivity and the accuracy of the instrument.

The light beam recombined by beam splitter 20 is deflected by a 90° deviation means shown as a prism 24 to the objective system of the instrument generally designated by 25. This objective system is shown as comprising an eye-piece or ocular 26 and a lens means 27. The lenses of eye-piece 26 and objective 27 are shown as simple lenses but obviously a more complicated lens system may be and is generally employed.

The objective means 25 are of a well known type such that interference fringes indicative of the atmospheres in the chambers may be observed through the eye-piece.

Figure 2:
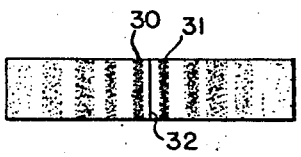
Fig. 2 is a view of the interference fringes which may be observed through the objective or telescope of the instrument.

Fig. 2 shows the interference fringes as can be seen through the eye-piece. These fringes generally consist of two black fringes 30 and 31 and several red and green fringes on both sides of the black fringes.

Let it first be assumed that both chambers in the casing are filled with the same atmosphere for instance, pure air, then the black fringes 30 and 31 and the colored fringes associated therewith will occupy a symmetric position relative to a reference line 32. When now a gas is introduced into the test chamber having a different refractive index, the fringes will be shifted to the right or left depending upon the nature of the gas introduced into the test chamber, the extent of the shift increasing with an increasing concentration of added gas. In other words, the extent of the shift relative to the reference line 32 is a direct function of the difference in the composition of the gases in the test chamber and the reference chamber respectively. Accordingly, an association of properly calibrated indicating or scale means with the objective means of the instrument permits a direct reading of the difference in the composition of the gas contents of the chambers or in other words of the concentration of gas introduced into the test chamber.

As appears from the previous description, the accuracy of the indication of the instrument thus obtained requires that the refractive index affecting the light beam traversing passages 16 and 17 of the reference chamber remains constant. This refractive index is influenced, however, not only by the composition of the gas within the reference chamber but also by the pressure prevailing therein. The problem of maintaining constant the composition of the gas in the reference chamber could be easily solved by sealing this chamber. But, the problem of eliminating the effect of a change in pressure is a much more difficult one, particularly when it is considered that interferometers of the kind here in question are primarily intended for use in mines and similar locations in which a high temperature may prevail and the atmospheric pressure may be considerably higher than the pressure at sea level. Obviously, both the temperature and the prevailing atmospheric pressure will affect the refractive index of the gas content in the reference chamber. Furthermore, the pressure within a sealed reference chamber will not be necessarily the same as the pressure within the test chamber which by its nature is in free communication with the ambient atmosphere to be supervised. The result is a falsification of the indications given by the instrument.

On the other hand, a free access of the ambient atmosphere to the reference chamber would change the gas content therein by diffusion so that the refractive index of the gas in the reference chamber would no longer serve as a true reference value.

The present invention solves the aforedescribed problem by connecting the reference chamber with the ambient atmosphere through a very long tubing generally designated by 35 such as a thin-walled small-bore hose of a material impervious to gas. It has been found that a hose made of thin metal or plastic is suitable for the purpose. One end of the hose communicates with the passages 16 and 17 and the other is open to the ambient atmosphere. Such long small-bore hose will on one hand effect a continuous equalization of pressure between the reference chamber and the ambient atmosphere and on the other hand permit the ambient atmosphere to penetrate only very slowly into the reference chamber. Practical tests have shown that the gas in the reference chamber remains substantially unchanged for a period of time amply sufficient in practice.

According to the now preferred embodiment of the invention, tubing 35 is tightly coiled so that the space occupied by it is reduced to a minimum. The small bulk of the tubing permits to house the same in the instrument casing. The result is a self-contained, compact and portable interferometer which is unaffected by changes in the ambient atmospheric conditions.

The test chamber 15 should be visualized as being in free communication with the ambient atmosphere. The arrangement provided for this purpose will be more fully explained in connection with Figs. 7 and 8.

Figure 3:
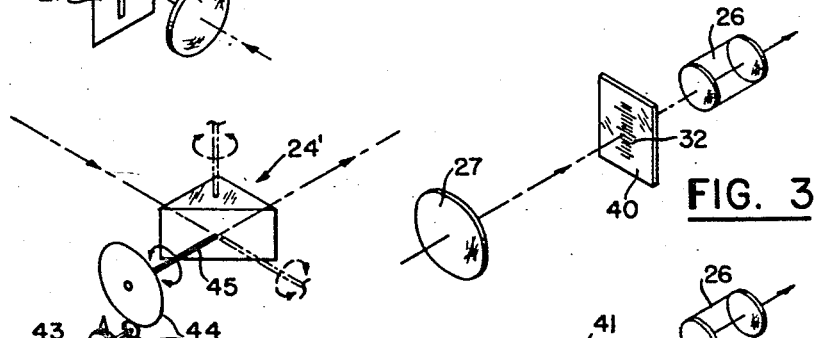
Fig. 3 is a perspective view of the objective of the instrument and of a scale for reading the difference in the composition of the gases in the reference chamber and the test chamber respectively.

Fig. 3 shows one of the means provided according to the invention for ascertaining the difference in the composition of the gases in the reference chamber and the test chamber respectively. According to Fig. 3, a calibrated scale 40 is disposed in the focal plane of lens 27 of objective 25. This scale is so calibrated that the black fringes 30 and 31 will occupy a symmetric position relative to the reference line 32 which is in the center of the scale. As will be obvious, a suitable calibration of the scale permits directly to ascertain the concentration of a gas such as for instance a methane gas contained in the air entering the test chamber.

Figure 4:
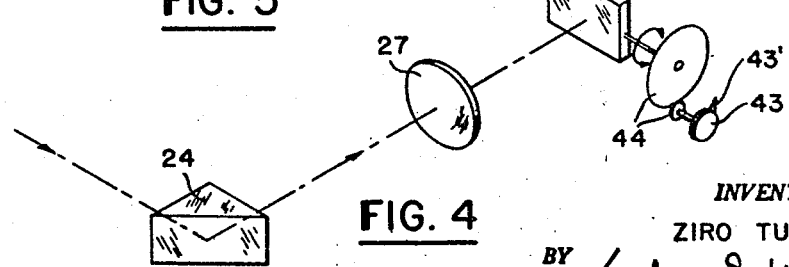
Fig. 4 is a perspective view of the objective similar to Fig. 3 and showing a modification of the means for reading the difference in the composition of the gases.

Fig. 4 shows an arrangement in which a plane-parallel plate 41 is disposed in the path of the recombined light beams between objective lens 27 and eye-piece 26. This plate is rotatable about an axis perpendicular to the optical axes of the objective 25. Any mounting of the plate suitable for the purpose may be employed. There is shown by way of example a shaft 42 supporting the plate. This shaft can be rotated by turning an adjustment knob 43 which is coupled with the shaft 42 by a gear train 44.

It will be evident that the angular position of plate 41 relative to the optical axis of the objective 25 will affect the position of the interference fringes relative to a reference line. Let it now be assumed that the fringes are displaced relative to the reference line due to a difference in the composition in the gases in the reference chamber and the test chamber respectively. Then, a turning of plate 41 about its axis will permit to shift the fringes into their symmetric or zero position relative to the reference line. Accordingly, the angular turning of the plate relative to the optical axis constitutes an indication of the percentage of deleterious gas present in the test chamber. Adjustment knob 43 should be visualized as coacting with a stationary correspondingly calibrated scale and may be provided for this purpose with a pointer 43'.

Figure 5:
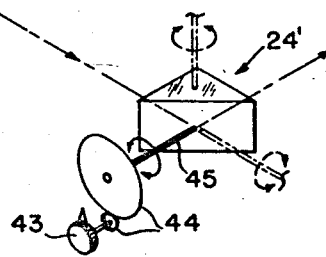
Fig. 5 is a perspective view of another modification of the means for reading the difference in the composition of the gases.

Fig. 5 shows an arrangement in which the principle of Fig. 4 is applied to a prism 24'. If this prism is turned about one of its axes it will cause a corresponding shifting of the interference fringes. The prism is shown as being rotatable by means of a shaft 45 which may again be actuated by adjustment knob 43. This knob should be also visualized as coacting with a scale as described in connection with Fig. 4.

Figure 6:
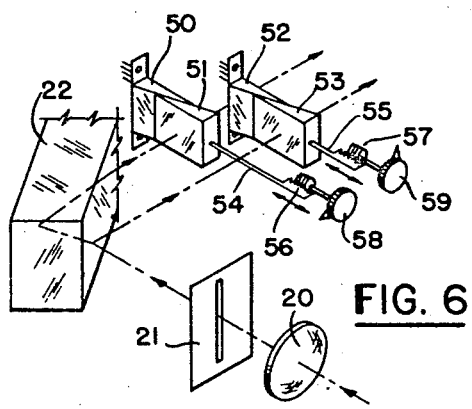
Fig. 6 is a perspective view of still another modification of the lens for reading the difference in the gases.

Fig. 6 shows an arrangement in which two pairs of transparent wedges 50, 51 and 52, 53 are disposed in the optical paths of the light beams incident to casing 10. The four wedges have equal angular gradients and the two wedges of each pair are movable relative to each other. Any means suitable for this purpose may be employed. Wedges 51 and 53 are shown as each supporting a rack 54 and 55 respectively coacting with worm gears 56 and 57 respectively. A rotation of knobs 58 and 59 respectively will move the two wedges of each pair either toward each other or away from each other. It should be understood that the adjustment of the wedges as used in actual practice may be much more involved but it is believed that the illustrated simple adjustment is sufficient to illustrate the relative displacement of the wedges.

It will be evident that, depending upon the relative position of the wedges, more or less of the wedge material is included in the paths of the light beams and that the total thickness of the included wedge material affects the lengths of the paths of the light beams accordingly. Consequently, an adjustment of the relative wedge position permits to shift the position of the interference fringes relative to the reference line. Knobs 58 and 59 should be visualized as coacting with correspondingly calibrated scales so that the position of pointers on the knobs relative to the scales will permit a direct reading of the composition of the gas in the test chamber.

The adjustment and indicating means according to Figs. 3 to 6 may be used singly or in combination.

To prepare the instrument for an initial calibration or for a reading, both chambers of the instrument are first filled with pure air or any other suitable gas. The position of the interference fringes under these conditions is adopted as the zero position. Then the gas or air mixture to be tested is admitted into the test chamber. The difference in the composition of the air in the reference chamber and the air-gas mixture in the test chamber can be ascertained by measuring the displacement of the interference fringes relative to the previously established position. The extent of the displacement of the interference fringes is determined from the equation $$Z\lambda = k \cdot x \cdot l(n_g - n_a)/100$$

wherein Z is the extent of the displacement of the fringes; $\lambda$ is the wave length of light; $k$ a constant; $x$ the concentration of the added gas in percents; $l$ the effective length of the test chamber which is twice the geometrical length of the chamber; $n_g$ and $n_a$ are the refractive indices of gas and air respectively.

The value Z of the fringe displacement is represented in Figs. 4 to 6 by the angular position of the respective adjustment knobs.

Figs. 7 to 9 show the structural arrangement of an interferometer according to the invention.

Figs. 7 shows the outer housing 60 of the instrument. 61 is the window of the eye-piece which can be covered by a cover 62 to protect the components of the eye-piece. 63 is an adjustment knob to adjust the fringe position as has been previously described. The knob may also be protected by means of a cover 64.

Air to be tested is admitted into the test chamber by an inlet port 65 which according to Fig. 7 is shown on one side of the instrument and according to Fig. 8 on the top of the instrument. Experience has shown that it is necessary or at least advisable to flush the test chamber several times with fresh air before the instrument is used. For this purpose, an aspirator 66 is provided which can be connected to a port leading into the test chamber. In Fig. 8 this port is shown in the form of a nipple 67 leading through a cartridge 68 containing a chemical absorbent and a pipe 69 into the test chamber. The absorbent serves to remove vapor and carbon dioxide frequently present in the air in coal mines which is necessary to detect certain gases such as methane.

Fig. 8 further shows conduit 18 connecting the two passages of the reference chamber and a nipple 70 which serves to connect the respective end of coil 35 to passage 16 of the reference chamber. The figure also shows a source of light 19 in form of a light bulb which is connected to a battery 71. The circuit of the light bulb is controlled by a switch button 72. Depression of this button will light the lamp and make viewable the interference fringes through the eye-piece window 61. Finally, Fig. 8 shows a conduit 65' leading from inlet port 65 into test chamber 15.

Fig. 9 shows the adjustment of prism 24. This prism is secured to an arm 73 by means of a flexible spring 74. A rotation of knob 63 will cause a corresponding tilting of prism 24. The prism was described in connection with Fig. 5 as being rotatable but as will be evident, a tilting of the prism relative to the light beams has substantially the same optical effect as a rotation of the prism.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. An interferometer for detecting the difference in the composition of a reference gas and a gas to be supervised, comprising a reference chamber for the reference gas including two passages disposed in parallel relationship spaced apart and communicating with each other, a test chamber for the gas to be supervised, a source of light, a beam splitter splitting the light emanating from said source of light in two parallel beams of light and disposed adjacent to one end of said chamber to direct one of said beams through one passage of the reference chamber and the other through the test chamber, light deviating means disposed adjacent to the opposite end of the chambers and deflecting the respective beam through the second passage of the reference chamber and the other beam through the test chamber back to the beam splitter, the said beam splitter and the said light deviating means being disposed in an optical relationship such as to recombine the two beams, objective means disposed in the optical path of said recombined beams for observing interference fringes as caused by a difference in the composition of said gases, and pressure equalizing means communicating with said reference chamber, the said equalizing means including a tube of gas impervious material connected on one end to the reference chamber and open at the other end to connect the reference chamber with the ambient atmosphere, the length and the inner diameter of said tube being correlated so as to impede the influx of the ambient atmosphere into the reference chamber while permitting equalization of the pressure in the reference chamber with the ambient atmospheric pressure.

2. An interferometer according to claim 1, wherein the said tube is in form of a thin-walled hose coiled into a small bulk.

3. An interferometer for detecting the difference in the composition of a reference gas and a gas to be supervised, comprising a reference chamber for the reference gas including two passages disposed in parallel relationship spaced apart and communicating with each other, a test chamber for the gas to be supervised disposed between said passages, a source of light, a beam splitter splitting the light emanating from said source of light in two parallel beams of light and disposed adjacent to one end of said chambers to direct one of said beams through one passage of the reference chamber and the other through the test chamber, first light deviating means disposed adjacent to the opposite end of the chambers and deflecting the respective beam through the second passage of the reference chamber and the other beam through the test chamber back to the beam splitter, the said beam splitter and the said light deviating means being disposed in an optical relationship such as to recombine the two beams, objective means disposed in the optical path of said recombined beams for observing interference fringes as caused by a difference in the composition of said gases, the said objective means including an eye-piece and an objective lens, and adjusting and indicating means for indicating the difference in the composition of said gases, the said adjusting and indicating means including second light deviating means disposed in the paths of said light beams movable relative to the axes of said beams, the displacement of said second light deviating means as required to move the interference fringes into a predetermined position relative to a reference line being indicative of the difference in the composition of the gases in the reference chamber and the test chamber respectively, and pressure equalizing means communicating with said reference chamber, said equalizing means including a tube of gas impervious material connected on one end to the reference chamber and open at the other end to connect the reference chamber with the ambient atmosphere, the length and the inner diameter of said tube being correlated so as to impede the influx of the ambient atmosphere into the reference chamber while permitting equalization of the pressure in the reference chamber with the ambient atmospheric pressure.

4. An interferometer according to claim 3, wherein the said second light deviating means comprise a plane-parallel plate disposed between the eye-piece and the objective lens means of said objective means in the optical center axis thereof and rotatable about an axis perpendicular to said center axis, the angle of turning of said plate relative to said center axis as required to move the interference fringes into the predetermined position relative to the reference line being indicative of the difference in the composition of the gases in the reference chamber and the test chamber respectively.

5. An interferometer according to claim 3, wherein the said second light deviating means comprise two pairs of transparent wedges, the wedges of one pair being disposed in the path of the light beam directed by said beam splitter into the respective passage of the reference chamber and the wedges of the other pair being disposed in the path of the light beam directed by said beam splitter into the test chamber, the wedges of each pair being displaceable relative to each other so as to vary the thickness of the wedge material included in the path of the respective light beam, the said thickness being indicative of the difference in the composition of the gases in the reference chamber and the test chamber respectively.

6. An interferometer according to claim 3, wherein the said second light deviating means comprises a 90° deviation prism disposed in the optical path of the recombined light beams deflected by the beam splitter to the objective means, the said prism being rotatable relative to the axes of said recombined light beams, the angle of turning of the prism as required to move the interference fringes into the predetermined position relative to the reference line being indicative of the difference in the composition of the gases in the reference chamber and the test chamber respectively.

7. An interferometer according to claim 3, wherein a scale means is placed in the focal plane of said objective lens, the said scale means being calibrated to indicate the displacement of the interference fringes as caused by differences in the composition of the gases in the reference chamber and the test chamber respectively.

8. An interferometer for detecting the difference in the composition of a reference gas and a gas to be supervised, comprising a reference chamber for the reference gas including two passages disposed in parallel relationship spaced apart and communicating with each other, a test chamber for the gas to be supervised disposed between said passages, a source of light, a beam splitter splitting the light emanating from said source of light in two parallel beams of light and disposed adjacent to one end of said chambers to direct one of said beams through one passage of the reference chamber and the other through the test chamber, first light deviating means disposed adjacent to the opposite end of the chambers and deflecting the respective beam through the second passage of the reference chamber and the other beam through the test chamber back to the beam splitter, the said beam splitter and the said light deviating means being disposed in an optical relationship such as to recombine the two beams, objective means disposed in the optical path of said recombined beams for observing interference fringes as caused by a difference in the composition of said gases, the said objective means including an eye-piece and an objective lens, adjusting and indicating means for indicating the difference in the composition of said gases, the said adjusting and indicating means including second light deviating means disposed in the paths of said second light beams movable relative to the axes of said beams, the displacement of said light deviating means as required to move the interference fringes into a predetermined position relative to an interference line being indicative of the difference in the composition of the gases in the reference chamber and the test chamber respectively, and pressure equalizing means communicating with said reference chamber, the said equalizing means including a tube of gas impervious material connected on one end to the reference chamber and open at the other end to connect the reference chamber with the ambient atmosphere, the length and the inner diameter of said tube being correlated so as to impede the influx of the ambient atmosphere into the reference chamber while permitting equalization of the pressure in the reference chamber with the ambient atmospheric pressure.

9. An interferometer according to claim 8, wherein the said tube is in form of a thin walled hose coiled into a small bulk.

10. An interferometer according to claim 8, wherein the said second light deviating means comprise two pairs of transparent wedges, the wedges of one pair being disposed in the path of the light beam directed by said beam splitter into the respective passage of the reference chamber and the wedges of the other pair being disposed in the path of the light beam directed by said beam splitter into the test chamber, the wedges of each pair being displaceable relative to each other so as to vary the thickness of the wedge material included in the path of the respective light beam, the said thickness being indicative of the difference in the composition of the gases in the reference chamber and the test chamber respectively.

References Cited in the file of this patent

UNITED STATES PATENTS

| 1,770,355 | Doi | July 8, 1930 |
| 2,286,621 | Hurley | June 16, 1942 |
| 2,427,996 | Seaman | Sept. 23, 1947 |
| 2,668,471 | Benzinger et al. | Feb. 9, 1954 |

FOREIGN PATENTS

| 577,377 | Germany | July 12, 1933 |